May 26, 1970  TAKAJI SUZUKI ET AL  3,513,834
ANESTHETIC DEPTH MEASURING SYSTEM
Filed Nov. 21, 1967  4 Sheets-Sheet 1

INVENTORS
TAKAJI SUZUKI, ZENMON ABE, SADAO HORIGUCHI
BY KAZUHIKO AMANO
Craig & Antonelli
ATTORNEYS May 26, 1970    TAKAJI SUZUKI ET AL    3,513,834
ANESTHETIC DEPTH MEASURING SYSTEM
Filed Nov. 21, 1967    4 Sheets-Sheet 4

INVENTORS
TAKAJI SUZUKI, ZENMON ABE, SADAO HORIGUCHI
BY KAZUHIKO AMANO

Craig & Antonelli
ATTORNEYS

United States Patent Office 3,513,834
Patented May 26, 1970

3,513,834
ANESTHETIC DEPTH MEASURING SYSTEM
Takaji Suzuki and Zenmon Abe, Kokubunji-shi, Sadao Horiguchi, Yokohama, and Kazuhiko Amano, Tokyo, Japan, assignors to Hitachi, Ltd., Tokyo, Japan, a corporation of Japan
Filed Nov. 21, 1967, Ser. No. 684,777
Claims priority, application Japan, Nov. 21, 1966, 41/76,120
Int. Cl. A61b 5/05
U.S. Cl. 128—2.1          5 Claims

ABSTRACT OF THE DISCLOSURE

An electrical impulse is imparted to a distal portion of a human body to obtain a first and a second peaks in a brain wave which is originated by an evoked encephalo-electrical activity in response to the impartation of the electrical impulse, such that the peak value as obtained by measurement in an anesthetic state in question is then compared with the peak value in a non-anesthetic state to determine the anesthetic depth of the questioned anesthetic state.

BACKGROUND OF THE INVENTION

This invention relates to anesthetic depth measuring systems and more particularly to an anesthetic depth measuring system of the type which utilizes an evoked encephalo-electrical activity originated by impartation of an electrical stimulation to the human body.

Anesthesia is generally classified into the following three stages depending on its depth:

Stage I—Analgesic stage
Stage II—Delirious stage
Stage III—Surgical stage

Stage I represents the shallowest state of anesthesia in which no pain is sensed and the muscles operate normally although consciousness is gradually lost. As anesthesia is applied to a deeper degree, the restriction exerted by the high nervous center on the low nervous center is lost, and a region, that is, the delirious stage begins in which an anesthetized person shows a strong response to an external stimulation. A still deeper degree of anesthesia gives rise to a state of muscular relaxation, ending in Stage III, that is, the surgical stage in which the muscular relaxation is quite sufficient to permit surgical operations.

Heretofore, the anesthetic depth was measured on the basis of the variation in the physiological parameter such, for example, as the respiration or pupil, or the degree of the reflex or response to an external stimulation. However, a defect involved in the actual measurement of the anesthetic depth according to the above manner was that special knowledge and long experience were required for successful measurement, and a further defect was encountered with the above method of measurement in that the method lacked reliability since it relied chiefly on the subjective judgement of the operator. Especially, the anesthesia to be applied for eliminating labor pains encountered during childbirth must be maintained in the analgesic stage of an extremely shallow anesthetic depth in order that the mother's body can sufficiently maintain its force to deliver the child. In such a case, the measurement of the anesthetic depth has been quite difficult since the physiological parameter described above varies only slightly at such a shallow anesthetic depth. In this respect, in spite of the fact that the anesthetic depth plays such an important role as to be fatal to life, it is the present status that an anesthetic depth measuring system which can ensure completely objective measurement of the anesthetic depth has not yet been developed.

SUMMARY OF THE INVENTION

With a view to eliminate the defects of prior art as described above, the present invention contemplates the provision of a novel anesthetic depth measuring system which can electrically detect the range of the analgesic stage by detection and comparison of evoked encephalo-electrical activity originated in response to impartations of stimulations to a human body and can thereby exactly measure the anesthetic depth in the specified stage.

It will be noted that when a living body is in the analgesic state as in the case of, for example, a child delivery under analgesia, a pain sense organ which includes a pain receptor operatingly sensing the imparted stimulation, a conduction system consisting of nerve cells and nerve fibres operatively conducting therethrough the sensed stimulation by the pain receptor to the brain in which the conducted stimulation is recognized as a pain reduces its pain sensing characteristic. In particular, the effect of anesthetic agents appears mainly in the nerve cells and nerve fibres to render them unresponsive. Consequently, the analgesic state can be identified by observing whether or not a reaction in response to a stimulation imparted to a pain sensory system or a similar sensory system is conducted to the brain. The inventors have designed and conducted an experiment to measure the variation taking place in the brain wave in response to an external stimulation, that is, to find the relation between an evoked encephalo-electrical activity appearing in the brain wave and an anesthetic depth, and as a result, have discovered a remarkably interesting relationship therebetween.

The method employed in the experiment is comprised by imparting a train of electrical stimulation pulses between electrodes provided on a distal portion of the forearm, and by detecting an evoked encephalo-electrical activity from a brain wave obtained in response to the impartation of the train stimulation pulses across electrodes provided respectively parietal part and at an intermediate position on the line connecting from the parietal part to an ear. In the brain waveform detected by the above method, peak values are appeared in the vicinity of 25 ms. and 45 ms. after impartation of the electrical stimulation. The inventors examined the manner of variation of the peak values and the appearing times with respect to an anesthetic depth and discovered a very powerful fact for the successful measurement of the anesthetic depth. More precisely, it has been discovered that, although the appearing times of the above peak values are independent of the anesthetic depth, the peak values are gradually decreased when the analgesic stage begins, and are decreased to approximately half of the values appearing in a non-anesthetic state when the delirious stage begins. The above fact applies to both the peak value appearing in the vicinity of 25 ms. and the peak value appearing in the vicinity of 45 ms.

On the basis of the finding described above, the present invention provides an anesthetic depth measuring system comprising a controller, a detector for detecting a peak value of an encephalo-electrical activity occurring in the human body, a first and a second holder for holding therein the peak value, a first gate circuit for supplying the peak value detected by the detector to the first holder when the human body is in a non-anesthetic state, a second gate circuit for supplying the peak value detected by the detector to the second holder when the human body is in an anesthetic state, and a comparator for comparing the outptus of the first and second holders. When an electrical stimulation is imparted to a portion of the human body at the command of the controller in the above system, the detector detects the peak value of an evoked encephalo-electrical activity originated by the impartation of the electrical stimulation, and the first gate circuit and the second gate circuit are controlled by the controller so as to supply the peak value which appeared in the non-anesthetic state and the peak value which appeared in the anesthetic state to the first holder and the second holder, respectively. The output of the first and second holders are then compared in the comparator, that is, the peak value in the evoked encephalo-electrical activity which appeared in the non-anesthetic state is compared with the peak value of the evoked encephalo-electrical activity and which appeared in the anesthetic state so that thereby the anesthetic depth in the anesthetic state can be measured.

It is therefore an object of the present invention to provide an anesthetic depth measuring system which can be objectively liable to ensure the practice of, for example, a delivery under analgesia.

Another object of the present invention is to provide an anesthetic depth measuring system which is successfully applicable to such a medical field in which hypnotherapy may be employed for the medical treatment of such diseases as neurosis, bronchial asthma, gastric ulcer, cerebral palsy, etc.

A further object of the present invention is to provide an anesthetic depth measuring system which can positively eliminate any possibility of intermixing such an objectionable noise as a muscular electrical activity with the evoked encephalo-electrical activity.

The present invention will be described in detail with reference to the accompanying drawings in which like reference numerals are used throughout to denote like parts.

Description of the preferred embodiments

Figure 1:
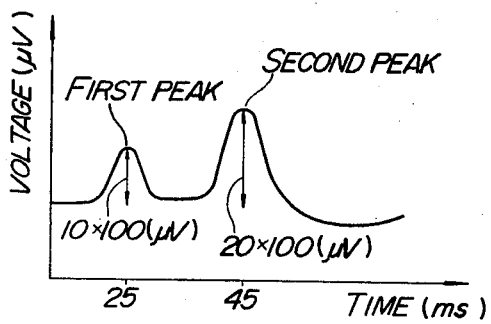
FIGS. 1 and 2 are graphs for the illustration of the characteristics of an evoked encephalo-electrical activity.

Referring to FIG. 1, there is shown a brain waveform including an evoked and a stational encephalo-electrical activities superposed on each other. The evoked encephalo-electrical activity has a first peak and a second peak of the kind referred to hereinbefore in connection with the experiment made by the inventors. From FIG. 1, it will be seen that the first peak and the second peak appear in the vicinity of 25 ms. and 45 ms. on the time axis, respectively, after a stimulation has been imparted to a portion of the human body. The magnitude of the peak developed by a single stimulation is about 10 $\mu$v. for the first peak and about 20 $\mu$v. for the second peak, and is thus a very minute value. Although the occurring time of occurrence and the magnitude of these peaks are somewhat variable depending on the body framework, the rate of conduction through the nervous system, and other factors proper to each individual person, they are constantly reproduced in response to impartations of stimulation to each person.

In a stationary state free from any stimulation, the magnitude of the stationary encephalo-electrical activity normally occurring in the human body is as high as the range of 20 to 50 $\mu$v. Accordingly, the first peak and the second peak in the evoked encephalo-electrical activity and the stationary encephalo-electrical activity overlap each other, and the peak values of the evoked encephalo-electrical activity cannot generally be identified. However, in view of the fact that the peak values in the evoked encephalo-electrical activity repeatedly appear at substantially constant intervals of time as described above in response to each stimulation impartation, the magnitude of the peak values can be multiplied by the number of times of multiple addition. On the other hand, the normal brain wave occurs at random. Accordingly, brain waves are added to each other with the result that they are multiplied by the square root of the added number of times as is commonly known in the art. Suppose now that N is the added number of times by repeated stimulation, then the signal-noise ratio is expressed as $$N/\sqrt{N}=\sqrt{N}$$

and thus the ratio of the evoked encephalo-electrical activity to the stationary encephalo-electrical activity can be improved by a factor of $\sqrt{N}$. It is therefore possible to distinctly detect the peak values of the evoked encephalo-electrical activity. It is to be noted that the respective magnitudes of the first peak and the second peak shown in FIG. 1 represent such values which are multiplied by the added number of times N, which in this case is 100, and the first peak is shown as having a magnitude of $$10\times100\ \mu v.$$

while the second peak is shown as having a magnitude of $20\times100$ $\mu$v.

Figure 2:
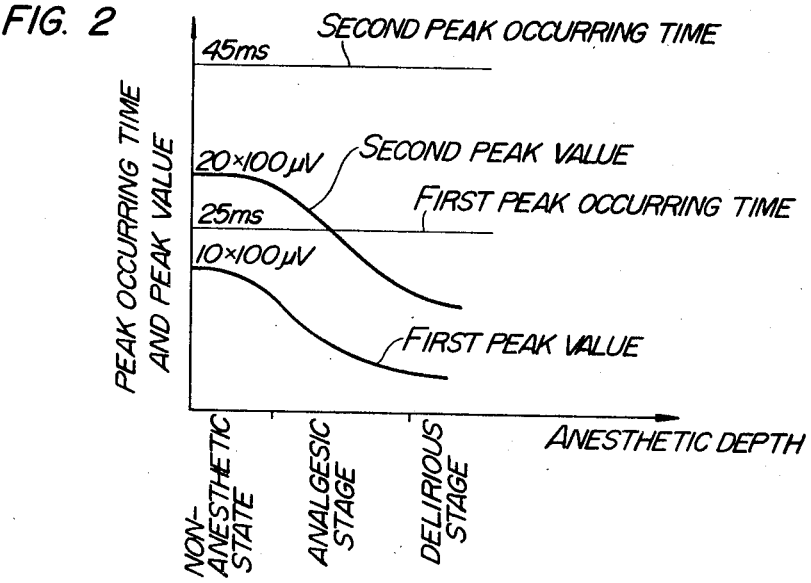

FIG. 2 shows graphically the results of an investigation which was made to find how the values of the first and second peaks of the evoked encephalo-electrical activity so obtained and their time of occurrence vary relative to the anesthetic depth in the non-anesthetic state, the analgesic stage and the delirious stage when general anesthesia is applied to the human body. In the measurement of the anesthetic depth described above, examinees were questioned as to the presence or absence of tinnitus and dizziness, and as to the way of sensing a pain sensory stimulating needle and an electrical stimulation in order to establish a comprehensive judgement about the anesthetic depth. In FIG. 2, the straight lines 1 and 2 represent the time of occurrence of the first and the second peak, while the curves 3 and 4 represent the values of these peaks, respectively. As will be apparent from these characteristic curves, the time of occurrence of the first peak and the second peak are quite stable and are free from any variation at such a shallow anesthetic depth, and the first peak appears in the vicinity of 25 ms. while the second peak appears in the vicinity of 45 ms. It will be further apparent that the values of the first peak and the second peak are both reduced gradually as the anesthetic depth becomes deeper, and their values at the transition from the end of the analgesic stage to the beginning of the delirious stage are reduced to approximately half of their respective previous values $10\times100$ $\mu$v. and $$20\times100\ \mu v.$$

observed during the non-anesthetic stage. There is a slight difference in the first and second peak values depending on individuals as pointed out previously, but the tendency of each peak value to gradually reduce is seen irrespective of any individual difference as the anesthetic depth becomes deeper as shown by the curves 3 and 4.

It will thus be understood that half of each peak value appearing during the non-anesthetic state corresponds substantially to the anesthetic depth appearing during the delirious stage. It is therefore possible to employ the above half value as a reference level and to thereby control the supply of an anesthetic agent on the basis of the above reference level so as to avoid the anesthetic depth from being further deepened to enter the delirious stage and to continuously maintain the optimum anesthetic depth required for the analgesic stage.

Figure 3:
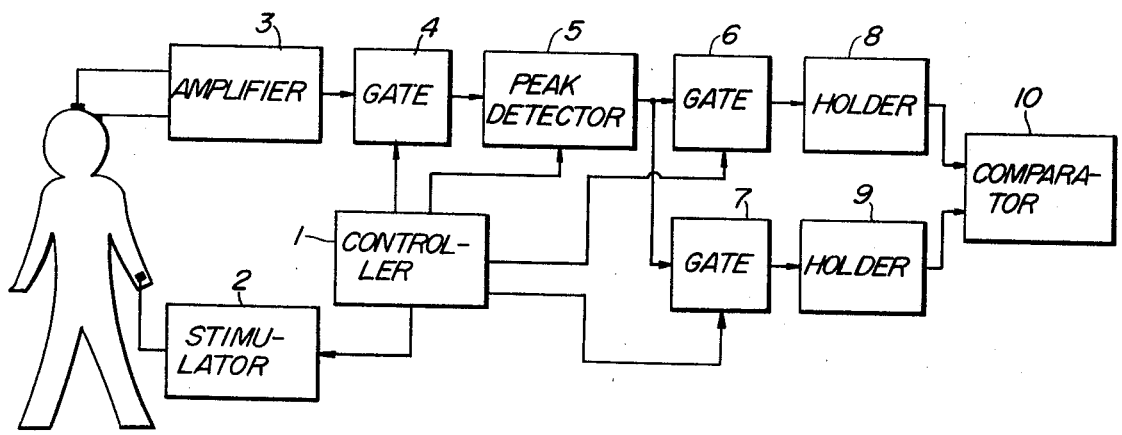
FIG. 3 is a block diagram showing the basic structure of the anesthetic depth measuring system according to the present invention.

FIG. 3 is a block diagram showing the basic structure of the anesthetic depth measuring system according to the present invention. The anesthetic depth measuring system includes therein a controller 1 which is connected with a stimulator 2 which is actuated by a command signal delivered from the controller 1. The stimulator 2 is operative to generate and impart to the human body an electrical stimulation which is repeated 100 to 200 times with a stimulating interval in the order of 100 ms. An amplifier 3 operationally amplifies an evoked encephalo-electrical activity originated by the impartation of the electrical stimulation on a human body imparted by the stimulator 2. A gate 4 is opened by a command signal delivered from the controller 1 when a first and a second peaks of the evoked encephalo-electrical activity are applied thereto from the amplifier 3 so that the peaks are conducted to a peak detector 5 which operationally measures each peak value supplied through the gate 4. There are also provided gates 6 and 7 which are opened or closed by a command signal delivered from the controller 1. Holders 8 and 9 are connected to the respective gates 6 and 7 in order to hold the respective peak values measured by the peak detector 5. A comparator 10 is connected to the holders 8 and 9 in order to compare the outputs of the holders 8 and 9.

With such an arrangement, the repetition of the electrical stimulation for 100 to 200 times with an interval of the order of 100 ms. gives a total stimulating time of 10 to 20 seconds, and hence, it may be considered that the anesthetic depth does not vary and remains constant during this period. Further, since the manner of response of the nervous system to a stimulation is all or none, the magnitude of the electrical stimulating pulse voltage is set at a value of 50 to 60 volts which is sufficient to excite the nervous system.

The anesthetic depth measuring system having such a structure operates in a manner as described below. When an electrical stimulation is imparted to a portion of the human body by the stimulator 2 in response to a command signal delivered from the controller 1, an evoke encephalo-electrical activity originated in response to the above stimulation is detected across electrodes provided on a parietal part of the head and is then amplified by the amplifier 3. Upon delivery of a command signal from the controller 1, the gate 4 is actuated at the time of occurrence of each peak value in the evoked encephalo-electrical activity to thereby detect the peak, which is supplied to the peak detector 5. In the above operation, when the above peak appears due to the impartation of the electrical stimulation in a non-anesthetic state of the human body, the output of the peak detector 5 is supplied through the gate 6 into the peak holder 8 to be held therein, while when the above peak appears due to the impartation of the electrical stimulation in an anesthetic state of the human body, the output of the peak detector 5 is supplied through the gate 7 into the peak holder 9 to be held therein. The outputs of the peak holders 8 and 9 are compared in the comparator 10 so that the anesthetic depth in the anesthetic state can thereby be measured.

Although, in the above arrangement, the peak value in the anesthetic state and the peak value in the non-anesthetic state are separately held and are compared with each other in the comparator 10, an indicator may be calibrated by taking the peak value appearing in the non-anesthetic state as a reference level and an indication given in the anesthetic state may merely be read to measure the anesthetic depth.

A practical embodiment of the present invention will be described in detail hereunder.

Figure 4:
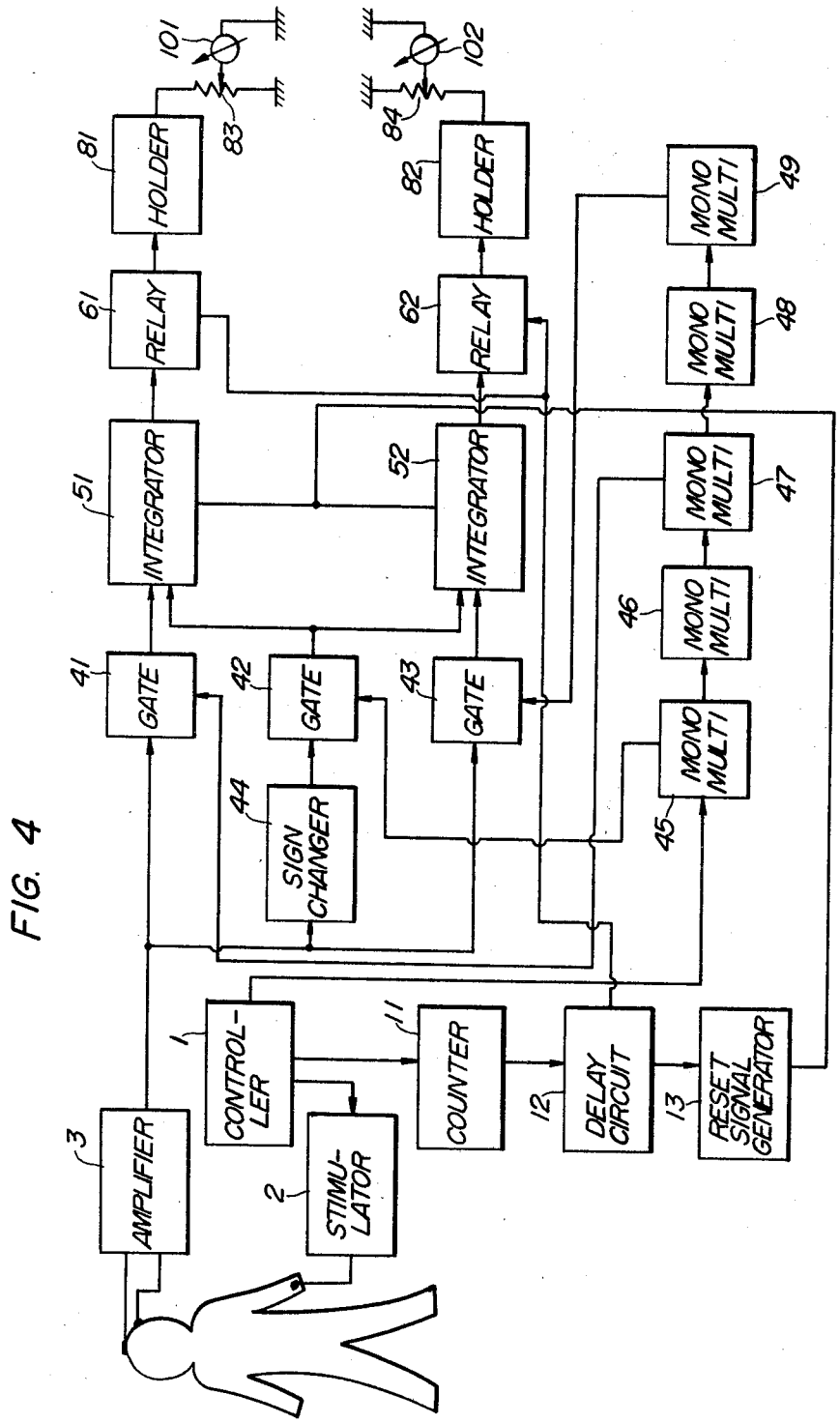
FIG. 4 is a block diagram showing the structure of an embodiment of the present invention.

Referring to FIG. 4, the anesthetic depth measuring system embodying the present invention includes therein a controller 1 which has a function as described with reference to FIG. 3, and more practically, may be a table multivibrator having a repetition period in the order of 100 ms. A stimulator 1 consists of an electrical circuit which may generate stimulating impulses in the order of 50 to 60 volts having a width in the order of 100 μs.

An amplifier 3 for amplifying an evoked encephalo-electrical activity may preferably have a very high input impedance and discrimination factor as in the case of a conventional bio-electricity measuring amplifier. Taking advantage of the invariability of the occurrence of the peak time, gates 41, 42 and 43 are controlled in such a manner that the gate 41 is opened during the period in which the first peak occurs, that is, during the period of 20 ms. to 30 ms. after the stimulating impulse has been imparted, and the gate 43 is opened during the period in which the second peak occurs, that is, during the period of 40 ms. to 50 ms. after the impulse has been imparted, while the gate 42 is opened during the period of 0 to 10 ms. after the impulse has been imparted. The opening and closure of the gates 41, 42 and 43 are controlled by the respective outputs of monostable multivibrators 47, 45 and 49. The reference numeral 46 and 48 designate multivibrators which are also of the monostable type and are employed to delay a command signal from the controller 1 for a predetermined time. The multivibrators 45, 47 and 49 have their circuit constants suitably preset so that they can remain in their on state for a limited time of 10 ms. when an input signal is supplied to each of them. However, since the time of occurrence of the first peak and the second peak varies slightly depending on each individual person, these multivibrators must be, as a matter of course, arranged for the capability of close adjustment. In the present embodiment, the multivibrators 46 and 48 for the delay purpose are so designed as to give a delay time of 10 ms. However, these multivibrators also may preferably be arranged to permit a delay time adjustment thereof. A counter 11 connected to the controller 1 counts the number of output pulses delivered from the controller 1 and is so constructed as to generate one output signal when, for example, one hundred pulses arrive from the controller 1. A delay circuit 12 connected to the output side of the counter 11 is operative to delay the output of the counter 1 for a predetermined time and delivers such a delayed output as an input to a reset signal generator 13. The delay circuit 12 is also a monostable multivibrator which has its circuit constants suitably preset so as to remain in its on state for a limted time of 10 ms. when an input signal is supplied thereto. Integrators 51 and 52 connected to the reset signal generator 13 are so arranged that the results of integration are reset by the output signal from the reset signal generator 13 after a time corresponding to the amount of delay in the output of the counter 11 by the delay circuit 12 has elapsed, that is, after their integrating operation has been completed.

The output of the evoked encephalo-electrical activity amplifier 3 is directly supplied to the gates 41 and 43, and is indirectly supplied to the gate 42 through a sign changer 44. The signals passed through the gates 41 and 43 are supplied to the respective integrators 51 and 52, while the signal passed through the gate 42 is supplied to both the integrators 51 and 52. The outputs of the integrators 51 and 52 are supplied through relays 61 and 62 to holders 81 and 82, respectively. The relays 61 and 62 are arranged to be opened or closed by the output of the counter 11. Indicators 101 and 102 are operative to display the values held in the holders 81 and 82, respectively.

Figure 5:
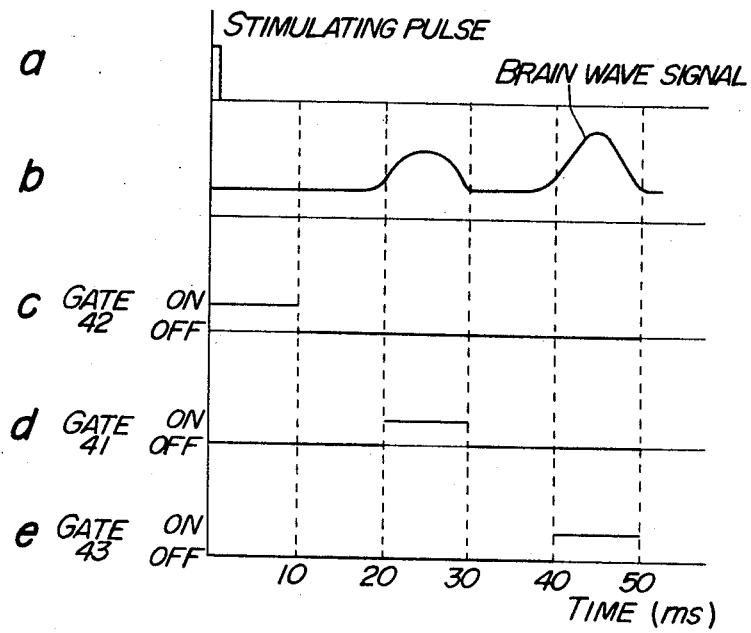
FIG. 5 is a graphic illustration of the operation of the measuring system shown in FIG. 4.

Having a structure as described above, the anesthetic depth measuring system embodying the present invention operates in a manner as described below. When a pulse is sent out from the controller 1, a stimulating pulse as shown in FIG. 5a is thereby delivered from the stimulator 2 to be applied to an electrode mounted on a distal portion of the forearm. The pulse from the controller 1 is simultaneously applied to the monostable multivibrator 45 to drive the same to its on state for a limited period of 10 ms. immediately after the application of the stimulation during which period no evoked encephalo-electrical activity appears. When the monostable multivibrator 45 is driven to its on state, an output appears from the multivibrator 45 to drive the gate 42 to its on state as shown in FIG. 5c. Therefore, the brain wave signal detected across the electrodes in which no evoked encaphalo-electric activity is included is inverted in its polarity by the sign changer 44 and is applied through the gate 42 to the integrators 51 and 52, respectively, so that the stationary encephalo-electric activities may only be integrated.

When the monostable multivibrator 45 is shut off the monostable multivibrator 46 is actuated for a period of 10 ms. and then when the multivibrator 46 is shut off, the monostable multivibrator 47 is driven to an actuated state for a limited period of 10 ms. Therefore, the gate 41 which is controlled by the output of the monostable multivibrator 47 is urged to an actuated state for a limited period of 10 ms. beginning at 20 ms. and ending at 30 ms. after the moment when the stimulating pulse has been imparted to the distal portion, with the result that the first peak portion is applied to the integrator 51 during its duration period as will be apparent from the relation between the waveform of the evolved encephalo-electrical activity shown in FIG. 5b and the on-period of the gate 41 shown in FIG. 5d. Further, when the multivibrator 47 is shut off, the monostable multivibrator 48 is actuated for a period of 10 ms. and then when the monostable multivibrator 48 is shut off, the monostable multivibrator 49 is driven to an actuated state for a limited period of 10 ms. Therefore, the gate 43 which is controlled by the output of the multivibrator 49 is urged to an actuated state for a limited period of 10 ms. beginning at 40 ms. and ending at 50 ms. after the moment when the stimulating pulse has been applied to the distal portion, with the result that the second peak portion of the brain wave signal is applied to the integrator 52 during its duration period as will be apparent from the relation between the waveform of the evoked encephalo-electrical activity shown in FIG. 5b and the on-period of the gate 43 shown in FIG. 5e. Consequently, the integrated first and second peaks having a duration period of 10 ms. are cancelled respectively wtih the integrated brain wave having a duration period of 10 ms. and including only a stationary encephalo-electrical activity in the integrators 51 and 52, respectively. As the stimulating pulses are repeatedly applied to the distal portion, and the above mentioned operation is repeated, the evoked encephalo-electrical activities are repeatedly and successively integrated and multiplied in the integrators 51 and 52.

Although the peak portions can not be distinctly identified in the early stage of integration because of the presence of a large noise, these peaks will appear very clearly as increase in numbers of integration repetitions to, to for example, about one hundred times. This is apparent from the previous description with regard to the relation between the evoked encaphalo-electrical activity and the stationary encephalo-electrical activity. More precisely stated. the evoked encephalo-electrical activity can be multiplied by N times when added N times, since it appears regularly in response to each stimulation impartation whereas noise component representing the stationary encephalo-electrical activity can only be multiplied by $\sqrt{N}$ times when added N times as pointed out previously since it appears at random, and thus the net result is that the evoked encephalo-electrical activity is multiplied by $\sqrt{N}$ times.

When a predetermined number of stimulating pulses have been applied to the distal portion in this manner, an output pulse is delivered from the counter 11 to the monostable multivibrator 12 to render the same in its on state. The relays 61 and 62 are therefore rendered conductive while the monostable multivibrator 12 is in the on state, with the result that the contents of the integrators 51 and 52 are transmitted into the holders 81 and 82, respectively. When the on state of the multivibrator 12 is over, a reset pulse is generated by the reset pulse generator 13. A pulse generated by the reset pulse generator 13 is supplied to the integrators 51 and 52 to reset the same. In the meantime, the values held in the holders 81 and 82 are displayed on the indicators 101 and 102, respectively.

In the present embodiment, the arrangement is such that the values of the first peak and the second peak are separately displayed on the individual indicators, but it will be understood that one of the peaks may solely be derived or both the peaks may be fed to a common integrator.

It will be understood that according to the present invention, the peak values of an evoked encephalo-electrical activity thus obtained correspond to or represent the anesthetic depth. Therefore, the peak values derived in the non-anesthetic state should be compared with the peak values derived in an anesthetic state in question in order to measure the anesthetic depth of the questioned anesthetic state. To this end, it is convenient to make the arrangement in such a way that voltage dividing resistors 83 and 84 shown in FIG. 4 are so adjusted that the peak values appearing in the non-anesthetic state correspond, for example, to "1" and thus the anesthetic depth can be measured by merely reading the values displayed on the indicators in the anesthetic state.

The anesthetic depth measuring system according to the present invention having a structure as described above exhibits a notable effect in that a doctor who does not have a thorough knowledge of anesthetic techniques can easily measure the anesthetic depth and control the measuring system as desired since the measurng system is specifically adapted to provide an objective measurement of the anesthetic depth through comparison between the peaks of an evoked encephalo-electrical activity appearing in a non-anesthetic state and the corresponding peaks appearing in an anesthetic state. The present invention thus contributes greatly to the medical science by affording a capability of the desired practice of obstetric analgesia.

In obstetric analgesia, an anesthetic depth which is so deep as to bring forth the delirious stage specified previously is strictly prohibited. Such a situation can be dealt with in the present invention by arranging in such a manner that a value corresponding to half of the peak value appearing in a non-anesthetic state may, for example, be taken as a first setting, a value intermediate between the first setting and the peak value appearing in the non-anesthetic state may be taken as a second setting, and the supply of an anesthetic agent is interrupted when the indication displayed on the indicator reaches the first setting, while the supply of the anesthetic agent is restarted when the above indication goes down to the second setting. The fact that the objectionable transition to the delirious stage from the analgesic stage can thus be prevented by controlling according to the above manner will be easily understood by reference to FIG. 2. Needless to say, in lieu of the above method, a peak value which is higher than the value bringing forth the delirious stage and corresponds to a most desirable anesthetic state may be preliminarily sought and such a value may be used as a reference level for the proper control of the anesthetic depth. It will be further understood that the measuring system according to the present invention is also applicable to the medical treatment of diseases such, for example, as neurosis, bronchial asthma, gastric ulcer and cerebral palsy falling within the medial field for which hypnotherapy is commonly employed.

The above embodiment has referred to an application in which the peak value of an evoked encephalo-electrical activity is measured in an analog fashion. However, the present invention is not limited to such analog measurement of the anesthetic depth and can also be used for the measurement of the anesthetic depth in a digital fashion. Such digital measurement can be made by amplifying a signal representing an evoked encephalo-electrical activity, subjecting the signal to an analogdigital conversion to obtain digital values, storing the individual sampled digital values in separate memories, adding successively the sampled values to the previously stored values in each memory at intervals of a predetermined period, repeating the above operation for a predetermined number of times, and comparing the stored values in the memories to obtain the peak value of the evoked encephalo-electrical activity.

Figure 6:
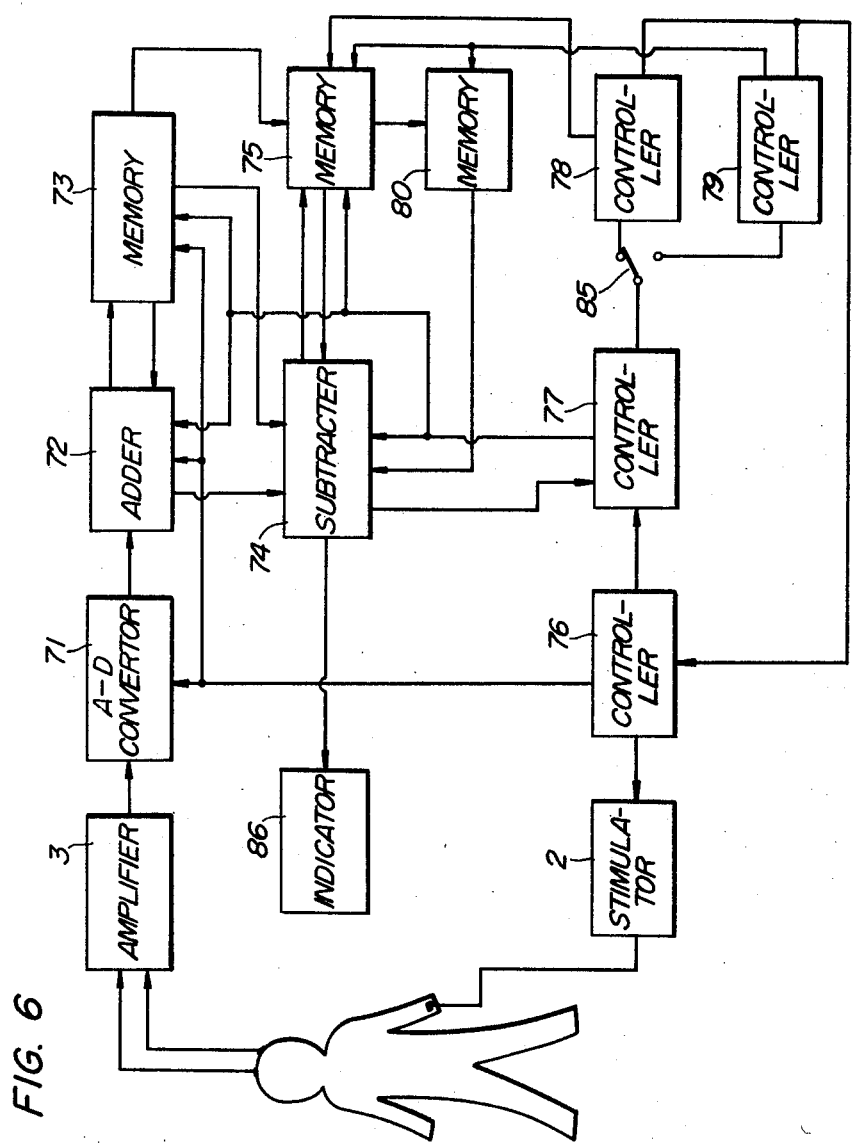

An embodiment shown in FIG. 6 is adapted to seek the peak value in a digital fashion. The anesthetic depth measuring system shown in FIG. 6 comprises an analog-digital converter 71 connected to an evoked encephalo-electrical activity amplifier 3 in order to effect an analog-digital conversion of an evoked encephalo-electrical activity, an adder 72 for adding a newly analog-digital converted signal to a previously analog-digital converted signal, a first memory 73 for storing the output from the adder 72, a subtracter 74 for seeking the peak values of the evoked encephalo-electrical activity, a second memory 75 for storing the above peak values, a first controller 76 for controlling a stimulator 2 for the repeated addition of the evoked encephalo-electrical activity, and a second controller 77 for controlling the operation for seeking the peak values described above. The second controller 77 is actuated by an output from the first controller 76 which is connected to the stimulator 2. The anesthetic depth measuring system further comprises a third controller 78 for controlling the second memory 75 so that the above peak values stored in the second memory 75 can be transferred to a third memory 80 for the comparison between the peak values which appeared in an anesthetic state and the peak values which appeared in a non-anesthetic state, a fourth controller 79 for controlling the third memory 80 so that the comparison between the peak values which appeared in the anesthetic state and the peak values which appeared in the non-anesthetic state can be made therein, a switch 85 selectively transmitting an output from the second controller 77 to the third controller 78 and the fourth controller 79, and an indicator 86 for displaying the values calculated by the subtracter 74.

The anesthetic depth measuring system shown in FIG. 6 operates in a manner as described hereunder. A pulse delivered from the first controller 76 actuates the stimulator 2 which generates a stimulating pulse and applies the stimulating pulse to an electrode mounted on a distal portion of the forearm. At the same time, the pulse delivered from the first controller 76 acts to set the analog-digital converter 71, the adder 72 and the first memory 73. A signal detected across electrodes disposed on a parietal part of the head is subjected to an analog-digital conversion by the analog-digital converter 71 with a sampling period in the order of 100 $\mu$s. to 1 ms., and the respective sampled values are fed into the adder 72 wherein the sampled values are added to values which have previously been stored in respective memory units of the first memory 73, so the respective result values are then fed back into the first memory 73 to be stored in respective memory units on behalf of originally stored values. The above mentioned operation is repeated about one hundred times within a period of 50 ms. at the minimum to 100 ms. at the maximum immediately after impartation of the stimulation to thereby distinctly define the first and second peaks of the evoked encephalo-electrical activity as described previously.

Upon completion of a predetermined number of addition, the first controller 76 delivers an output pulse which actuates the second controller 77 so as to seek the peak values of the evoked encephalo-electrical activity. More precisely, the adder 72 actuated by the second controller 77 seeks a mean value of those values stored in the first memory 73, which have been derived up to a period in the order of 10 ms. immediately after the impartation of the stimulation, that is, a period during which no peak appears in the evoked encephalo-electrical activity. Suppose now that the number of sampled values of the barin wave to be added is the 3rd power of 2, say, $2^3=8$, then the division for seeking the above means value can be effected by only shifting the adder 72 by the number of powers described above, and the mean value is displayed on the adder 72. Then, for seeking the peak values, the mutually adjacent sampled values of the brain wave which have been stored in the respective memory units of the first memory 73 are subtracted from each other at a time beginning 20 ms. and ending 30 ms. and also beginning 40 ms. and ending 50 ms. by means of the subtracter 74.

In the subtractive operation each sampled value is subtractively compared with the precedingly sampled value. When the former is larger than the latter which is indicated whether the positive or negative sign of the result of the subtraction made in the subtractor 74, and when the result is positive, the subtractor is still carried, while when the result is negative, the latter values giving such result, hence, the peak values are transferred to the second memory 75 from the first memory 73. These peak values are then transferred into the subtracter 74 for subtraction between these peak values and the mean value displayed on the adder 72, and the result of the subtraction is stored in the second memory 75 again. Simultaneously with the above subtraction, an output from the subtracter 74 actuates the second controller 77, which thereby delivers an output signal for selectively actuating the third controller 78 and the fourth controller 79. The connection between the second controller 77 and the third and fourth controllers 78 and 79 is such that the second controller 77 is connected with the third controller 78 through the switch 85 in the non-anesthetic state, while the second controller 77 is connected with the fourth controller 79 through the switch 85 in the anesthetic state.

When the third controller 78 is actuated, an output is delivered therefrom to transfer the peak values in the non-anesthetic state stored in the second memory 75 to the third memory 80. When the fourth controller 79 is actuated, an output is delivered therefrom to transfer the peak values in the anesthetic state stored in the second memory 75 and the peak values in the non-anesthetic state stored in the third memory 80 to the subtractor 74 for the sake of comparison between these peak values. It is thus possible to find whether either of the peak values appeared during the period of 20 to 30 ms. and 40 to 50 ms. after the impartation of the stimulation in the anesthetic state becomes as low as half of the peak values which appear in the non-anesthetic state, and if any one of the former values is found to be reduced to half of the latter values, this situation is displayed on the indicator 86 to indicate the fact that the delirious stage has taken place.

Upon completion of the above operation of the third controller 78 or the fourth controller 79, an output signal is delivered again from one of these controllers 78 and 79 to actuate the first controller 76, and a series of operations as described above are thereby repeated.

Another embodiment of the present invention which is an improvement in the above-described embodiment will be described with reference to FIG. 7.

The present embodiment is intended to deal with such a situation that, in a continuous measurement of the evoked encephalo-electrical activity for a long period of time, an examinee may move his body portion such as the head and a noise due to the development of a muscular electrical activity or the like may be intermixed with the evoked encephalo-electrical activity. Compared with the stationary encephalo-electrical activity having a voltage in the order of 50 $\mu$v. and the evoked encephalo-electrical activity having a voltage far lower than the above value, the noise evoked by the muscular electrical activity or the like described above has a voltage in the order of 100 $\mu$v. and a frequency component in the vicinity of 50 cycles per second. Such a frequency component in the noise overlaps the frequency of the evoked encephalo-electrical activity, thereby giving rise to a large error in the actual measurement.

Figure 7:
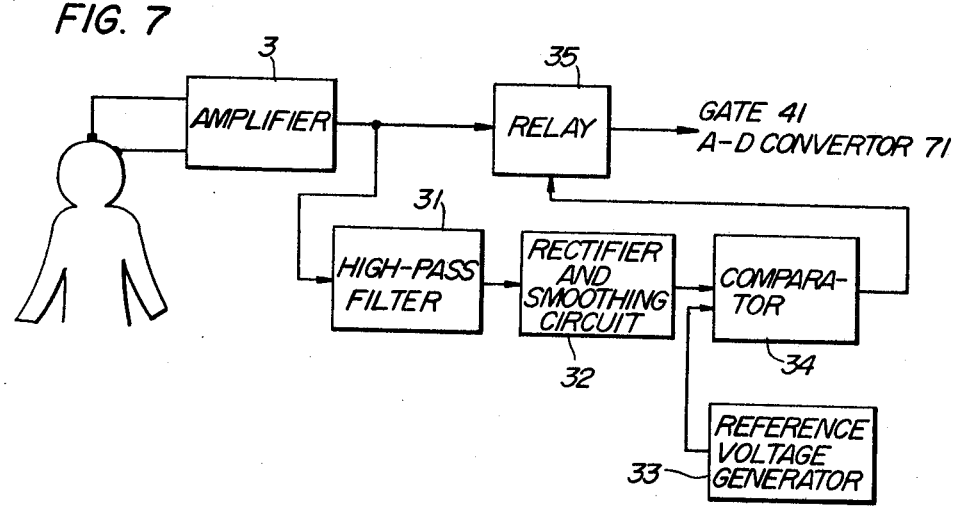
FIGS. 6 and 7 are block diagrams showing the structure of other embodiments of the present invention.

The measuring system shown in FIG. 7 is devised to eliminate the noise attributable to the muscular electrical activity or the like. In this system, any voltage level exceeding a 70μv. level is regarded as the noise described above, and this voltage value is taken as a reference level so that the measurement can be interrupted whenever a signal having a voltage level higher than the above reference level is detected from the head. The anesthetic depth measuring system shown in FIG. 7 comprises an evoked encephalo-electrical activity amplifier 3, a high-pass filter 31 having a cutoff frequency in the order of 50 cycles per second, a rectifier and smoothing circuit 32, a 70 μv. reference voltage generator 33, a comparator 34 whose two inputs are an output from the rectifier and smoothing circuit 32 and an output from the reference voltage generator 33, and a relay 35 which is urged to its open state by an output from the comparator 34. The system operates in such a way that, if a noise of the kind as described above might mix in a signal detected from the parietal part, the noise component is derived by the high-pass filter 31, and the output of the high-pass filter 31 is smoothed out by the smoothing circuit 32 to be supplied to the comparator 34 as a noise voltage. In the comparator 34, the noise voltage is compared with the output voltage delivered from the reference voltage generator 33, and an output appears from the comparator 34 when the former voltage is higher than the latter voltage to thereby urge the relay 35 to its open state, thus preventing the detected signal from being applied to the gate 41 or the analog-digital convertor 71 shown in FIG. 6.

The foregoing description has referred to a few specific embodiments of the present invention by way of example, but it will be understood that the present invention is in no way limited to such specific embodiments, and changes and modifications may be made therein without departing from the spirit of the present invention. For instance, the foregoing description has referred to a case in which the electrical stimulation is imparted to a distal portion of the forearm, but the present invention is in no way intended to restrict the electrode mounting position inasmuch as there is an invariable tendency toward a reduction in the peak values of the evoked encephalo-electrical activity originated in the anesthetic state although there may be a slight difference in the evoked encephalo-electrical activity depending on the position of impartation of the stimulation, the sort of the stimulation and the part from which the evoked encephalo-electrical activity is derived.

We claim:

1. An anesthetic depth measuring system comprising: means for imparting an electrical stimulation to a part of the human body; means for detecting at least one peak value of encephalo-electrical activities in a brain wave evoked by the impartation of the stimulation; and means for comparing a peak value of the evoked encephalo-electrical activities obtained in a non-anesthetic state with a peak value of the evoked encephalo-electrical activities appearing in a state to be measured.

2. An anesthetic depth measuring system according to claim 1, wherein the peak value comparing means operatingly detects such a time when the peak value of the evoked encephalo-electrical activities appearing in the anesthetic state is reduced to half of the peak value of the evoked encephalo-electrical activities obtained in the non-anesthetic state, so that the anesthetic depth is detected to be in the delirious stage.

3. An anesthetic depth measuring system according to claim 1, wherein said peak value detecting means comprises; at least one signal integrator; means for repeatedly supplying to the integrator for a predetermined period of time such a portion of the brain wave as including therein a peak value of the evoked encephalo-electrical activities; and means for repeatedly supplying to said integrator for a period of time equal to said predetermined period of time such a portion of the brain wave as excluding therefrom the evoked encephalo-electrical activities so that the brain wave portions respectively supplied to the integrator may be subtracted from each other, and said peak value comparing means operatingly compares the output of said integrator delivered in a non-anesthetic state with an output of said integrator delivered in a state to be measured.

4. An anesthetic depth measuring system according to claim 1, wherein said peak value detecting means comprises means for sampling at intervals of a predetermined sampling period such a portion of the brain wave as including at least a peak value of the evoked encephalo-electrical activities appearing in response to the impartation of the stimulation, said sampling being repeated; first memory means for adding the mutually corresponding sample brain wave values obtained in the respective samplings and for storing the respectively added sampled brain wave values, respectively; means for distinguishing the peak value from the brain wave values stored in said first memory means, and second memory means for storing different peak values which are obtained, respectively, in a non-anesthetic state and in a state to be measured by the distinguishing means, said peak value comparing means operatingly compares the contents stored in said second memory means with each other.

5. An anesthetic depth measuring system according to claim 1, wherein said peak value detecting means comprises means for detecting a noise component having a frequency higher than several-tens of cycles per second in the brain wave; means for rectifying and smoothing out the detected output from said noise component detecting means; means for generating a discriminating signal in response to an excess of the output of the rectifying and smoothing means over a predetermined reference value; and means for operatively interrupting the measuring operation of the system in response to generation of said discriminating signal.

References Cited

UNITED STATES PATENTS

| 2,690,178 | 9/1954 | Bickford. | |
|---|---|---|---|
| 3,364,929 | 1/1968 | Ide et al. | 128—2.1 XR |

FOREIGN PATENTS

| 806,703 | 6/1951 | Germany. |
|---|---|---|

WILLIAM E. KAMM, Primary Examiner